Feb. 17, 1959     H. W. SIMPSON     2,873,623

SIX SPEED TRANSMISSION

Filed April 4, 1957

INVENTOR.
Howard W. Simpson.
BY Farley Forster & Farley

United States Patent Office 2,873,623
Patented Feb. 17, 1959

2,873,623

SIX SPEED TRANSMISSION

Howard W. Simpson, Dearborn, Mich.

Application April 4, 1957, Serial No. 651,127

28 Claims. (Cl. 74—759)

This invention relates to planetary gearing in combination with clutch and brake means to form a unique power transmission for automotive vehicles in which 6 speeds forward and 2 speeds in reverse are obtained with only two sets of simple planetary gears. Two gearsets yielding six speeds and one reverse have been shown and described in my United States patent application Serial No. 482,102 and in my United States Letters Patent No. 2,749,775, issued June 12, 1956, but in some cases a single reverse is not sufficient.

The present invention provides both a slow and fast reverse as required in certain vehicles such as farm and industrial tractors of both wheel and track type.

Five friction type clutches and three brakes are used, the latter for holding various gear elements as reaction members. The use of several clutches and brakes is generally considered as a more economical method of obtaining many speeds than providing additional gearing.

The main object of this invention is, therefore, to reduce the cost of a 6 forward, and 2 reverse speed transmission.

Another object is to provide a transmission with a low and high reverse.

Another object is to provide a transmission with few idly spinning gears while working in the various speeds by reason of all the gears working in many of the speeds.

These and other objects will be apparent from the following specifications and claims taken in conjunction with the accompanying drawings, in which:

Figure 1:
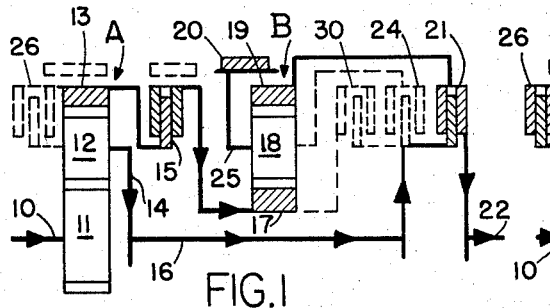
Figs. 1 to 6 are partial cross-sectional elevations of the transmission shown in first to sixth forward speeds, respectively.

In the drawings the gears, clutches and brakes that are working are shown in solid lines and in section, and those not working in dotted lines. The clutches which are engaged show with the plates in contact with each other, and released clutches show the plates separated.

Hydraulic servomechanism for operating the brakes and clutches is not shown because it is well known to those skilled in transmission design and is not a part of this invention. Brake bands are shown as being of the external contracting type with only a cross section of the band showing in contact with a brake drum when applied and raised off the brake band when released.

The gearing comprises two simple gear sets A and B. In Figs. 1 to 8 input shaft 10 is connected to sun gear 11 which meshes with planet gears, one of which, 12, is mounted on carrier 14. Ring gear 13 meshes with planet gears 12.

Gear set B has sun gear 17 meshing with planet gears 18 mounted on carrier 25. Planet gears 18 mesh with ring gear 19 which is connected to output shaft 22 at all times.

Clutches 15, 21, 24, 26 and 30, and brakes 20, 27 and 28 are applied and released as required to obtain the various speeds. Sun gear 11 is the input gear in all speeds.

In Fig. 1 brake 20 holds carrier 25 as a reaction member and sun gear 11 turns planet gears 12 and carrier 14 forward and ring gear 13 and sun gear 17 backward since clutch 15 is engaged. This turns ring gear 19 and output shaft 22 forward. Torque of carrier 14 is delivered to output shaft 22 through clutch 21, thus adding to the total output.

Figure 2:
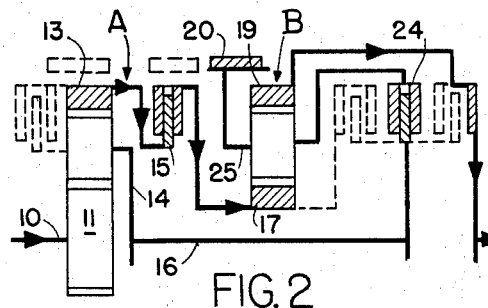

In Fig. 2 clutch 15 and brake band 20 remain engaged and carriers 14 and 25 are reaction members with ring gear 13 and sun gear 17 turning backward and ring gear 19 and output shaft 22 turning forward. Clutch 24 is engaged to connect carriers 14 and 25.

Figure 3:
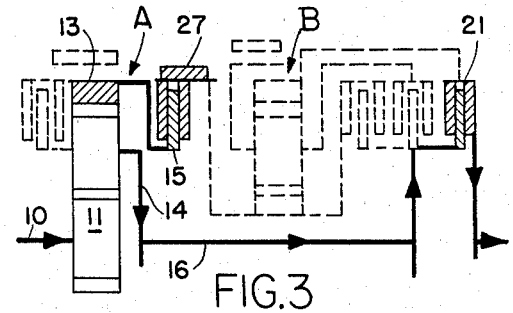

In Fig. 3, brake band 27 holds ring gear 13 as a reaction member and torque carrier 14 is coupled to output shaft 22 by clutch 21.

Figure 4:
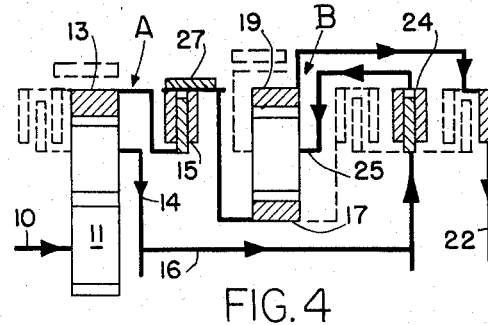

In Fig. 4, gearset A works exactly as in Fig. 3, but the output from carrier 14 is overdriven in gearset B by engaging clutch 24, with sun gear 17 as a reaction member and ring gear 19 being turned at an overdrive of 3rd speed which equals 4th speed.

Figure 5:
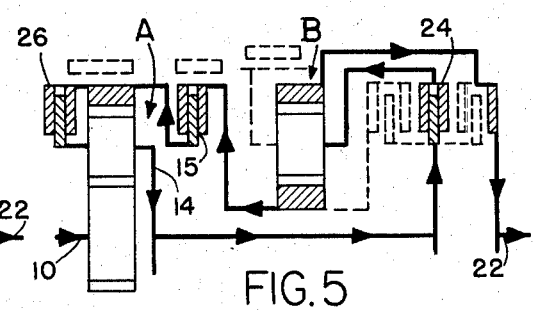

In Fig. 5, clutch 26 engages and since clutches 15 and 24 remain engaged, the gears are locked in direct drive.

Figure 6:
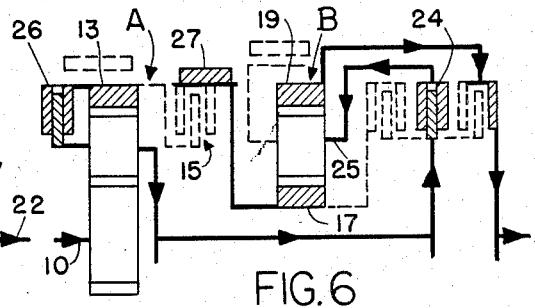

In Fig. 6, clutches 26 and 24 remain engaged but clutch 15 is released and brake band 27 holds sun gear 17 as a reaction member, thus producing overdrive, gearset A only being locked up in direct drive.

Figure 7:
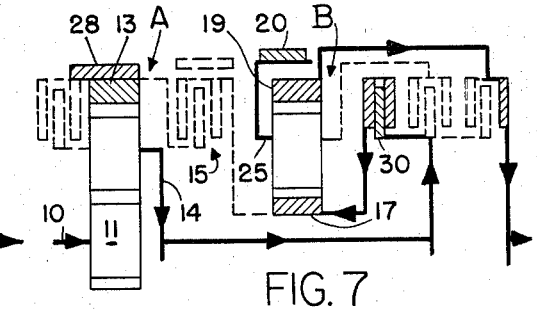
Fig. 7 shows low reverse speed.

In Fig. 7, brake bands 28 and 20 hold ring gear 13 and carrier 25 as reaction members and carrier 14 is driven forward at reduced speed and connected to sun gear 17 by clutch 30. This results in ring gear 19 turning forward at a slow reverse speed due to the double gear reduction.

Figure 8:
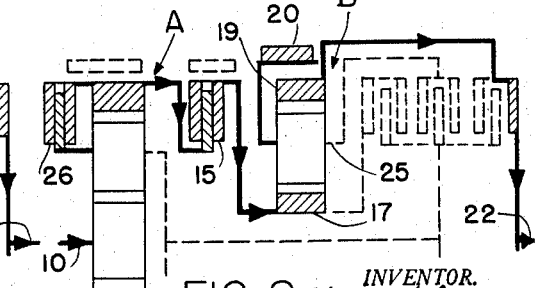
Fig. 8 shows high reverse.

In Fig. 8, gearset A is locked up in direct drive by clutch 26 and sun gear 17 is driven forward by clutch 15. With carrier 25 held by brake band 20, ring gear 19 and output shaft 22 turn at a fast or single reduction reverse speed.

Typical gear ratios for the eight speeds are 7, 4, 3, 2, 1 and .667 to 1 for the 6 forward speeds, and 6 and 2 to 1 for slow and fast reverse. These particular ratios occur when gearsets A and B have ring gears with twice as many teeth as their corresponding sun gears. Reverse speeds slower than low speed may be obtained if desired. Typical travel speeds for a tractor with the above gear ratios are 1.5, 2.6, 3.5, 5.25, 10.5 and 15.75 miles per hour forward and 1.75 and 5.25 miles per hour in reverse.

While preferred embodiments have been described above in detail, it will be understood that numerous modifications might be resorted to without departing from the scope of my invention as defined in the following claims.

I claim:

1. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained; selective engageable clutch means between the third element of the first gearset and the first element of the second set, selectively engageable clutch means between the second element of the first gearset and the load member whereby, when the last mentioned brake is applied and the two last-mentioned clutch means are engaged, a forward reduction ratio drive is obtained between the input and load members.

2. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained; selectively engageable clutch means between said third element of the first gearset and said first element of the second set, selectively engageable clutch means between said second element of each gearset whereby, when the last-mentioned brake is applied and the two last-mentioned clutch means are engaged, a forward reduction ratio drive is obtained between the input and load members.

3. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained, selectively engageable clutch means between said second element of the first gearset and the load member whereby, when the last-mentioned brake means and last-mentioned clutch means are engaged, a forward reduction drive is obtained between the input and load members.

4. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained, selectively engageable clutch means between said third element of the first gearset and said first element of the second set, selectively engageable clutch means between said second elements of each gearset and brake means for holding said third element of the first set and said first element of the second set whereby, when the two last-mentioned clutch means are engaged and the last-mentioned brake is applied, a forward reduction ratio drive is obtained between the input and load members.

5. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained, selectively engageable clutch means between said third element of the first gearset and said first element of the second set, selectively engageable clutch means between two elements of the first set and selectively engageable clutch means between said second elements of each gearset whereby, when the last three of said clutch means are engaged, a one-to-one direct drive is obtained between the input and load members.

6. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained, selectively engageable clutch means between two elements of the first gearset, selectively engageable clutch means between second elements of each gearset and a brake for holding said first element of the second gearset whereby, when the two last-mentioned clutch means are engaged and the last-mentioned brake is applied, an overdrive ratio is obtained between the input and output members.

7. In a variable speed transmission comprising power input and load members, a first planetary gearset having a first element driven by said input member, a second planetary gearset, selectively engageable clutch means for coupling a second element of the first gearset to a first element of the second gearset, brake means for holding a third element of the first gearset, brake means for holding a second element of the second gearset and a driving connection between a third element of the second gearset and said load member whereby, when said clutch means are engaged and both brakes are applied, a compound reverse drive is obtained, selectively engageable clutch means between two elements of the first gearset, selectively engageable brake means between said third element of the first gearset and the first element of the second set whereby, when the two last-mentioned clutch means are engaged and the last-mentioned brake is applied, a second reverse reduction drive is obtained between the input and load members.

8. In a variable speed transmission comprising power input and load members, a first planetary gearset having a first element driven by said input member, selectively engageable clutch means between second and third elements of the first gearset, a second gearset and selectively engageable clutch means between said third element of said first planetary set and a first element of said second planetary set, selectively engageable clutch means between second elements of each gearset, selectively engageable clutch means between said second element of the first set and said first element of the second set, a driving connection between a third element of the second set and said load member, and selectively engageable clutch means between said second element of the first set and said load shaft.

9. The combination set forth in claim 8 and a brake for holding said third member of said first gearset.

10. The combination set forth in claim 8 and a brake for holding said first element of said second gearset.

11. The combination set forth in claim 8 and a brake for holding said second element of said second gearset.

12. A variable speed transmission comprising input and load members, first and second axially aligned planetary gearsets each having sun, ring and carrier elements and at least one planet gear meshing with said sun and ring elements, a power input connection for the sun element of the first gearset, a driving connection between the ring and carrier elements of the first set, a driving connection between the ring element of the first set and the sun element of said second planetary gearset, a driving connection between the carriers of each gearset, a driving connection between the carrier of the first set and the sun element of the second set, a driving connection between the carrier of the first set and said load member and a driving connection between the ring element of the second gearset and said load member.

13. The combination set forth in claim 12 and a brake for holding said ring element of said first gearset.

14. The combination set forth in claim 12 and a brake for holding said sun element of said second gearset.

15. The combination set forth in claim 12 and a brake for holding said carrier element of said second gearset.

16. A variable speed transmission comprising input and load members, first and second axially aligned planetary gearsets each having sun, ring and carrier elements and at least one planet gear meshing with said ring and sun elements, a driving connection between said input member and the sun element of the first gearset, a driving connection between the ring element of the second set and the load member, selectively engageable clutch means between two elements of the first gearset, selectively engageable clutch means between the ring element of first set and the sun element of the second set, and selectively engageable clutch means between the carrier element of the first set and said load member.

17. The combination set forth in claim 16 and a brake for holding the ring element of said first gearset.

18. The combination set forth in claim 16 and a brake for holding the sun element of said second gearset.

19. The combination set forth in claim 16 and a brake for holding the carrier element of said second gearset.

20. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the ring and carrier elements of the first gearset, selectively engageable clutch means between the ring element of the first set and the sun gear of the second set, and selectively engageable clutch means between the carrier element of the first gearset and the load member.

21. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between the first set carrier element and the load member, selectively engageable clutch means between the first set ring element and second set sun element whereby, when the two last mentioned clutch means are engaged and said second brake is applied, a forward reduction drive is obtained between said input and load members.

22. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between the carrier elements of each gearset, selectively engageable clutch means between the first set ring element and second set sun element whereby, when the two last mentioned clutch means are engaged and said second brake is applied, a forward reduction drive is obtained between the input and load members.

23. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between the first set carrier and the load member, whereby, when the last mentioned clutch means is engaged and said first brake is applied, a forward reduction drive is obtained between said input and load members.

24. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between the carrier elements of each gearset, brake means for holding the first set ring element and the second set sun element whereby, when the last-mentioned clutch and brake means are applied, a forward reduction drive is obtained between the input and load members.

25. A variable speed transmission comprising input and load members, first and second axially aligned planetary gearsets each having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes applied, a compound reverse drive is obtained, selectively engageable clutch means between two elements of the first gearset, selectively engageable clutch means between the first set ring element and the second set sun element, and selectively engageable clutch means between the carrier elements of each gearset whereby, when the three last-mentioned clutch means are engaged, a one-to-one direct drive is obtained between the input and load members.

26. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between two elements of the first gearset, selectively engageable clutch means between the carrier elements of each gearset, and brake means for holding the sun element of the second gearset whereby, when the last two mentioned clutch means are engaged and the last-mentioned brake is applied, the load shaft is driven forward at an overdrive speed ratio.

27. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable clutch means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between two elements of the first gearset, selectively engageable clutch means between the first set ring element and second set sun element whereby, when the two last-mentioned clutch means are engaged and the said second brake is applied, a second reverse reduction drive is obtained between the input and output members.

28. A variable speed transmission comprising input and load members, first and second axially aligned planetary gearsets each set having sun, ring and carrier elements and at least one planet gear meshing with said ring and sun elements, a driving connection between said input member and the sun element of the first gearset, a driving connection between the ring element of the second set and the load member, selectively engageable means between the carrier element of the first gearset and the sun element of the second set, a first brake for holding the ring element of the first set, and a second brake for holding the carrier element of the second set, whereby, when said clutch means is engaged and said brakes are applied, a compound reverse drive is obtained, selectively engageable clutch means between two elements of the first gearset, selectively engageable clutch means between the carrier elements of each gearset whereby, when all three of said clutch means are engaged, a one-to-one direct drive is obtained between the input and load members.

No references cited.